Sept. 9, 1958     M. L. GOLDBERG     2,851,362
METHOD OF DEBONING FOWL NECKS
Filed April 15, 1957     2 Sheets-Sheet 1
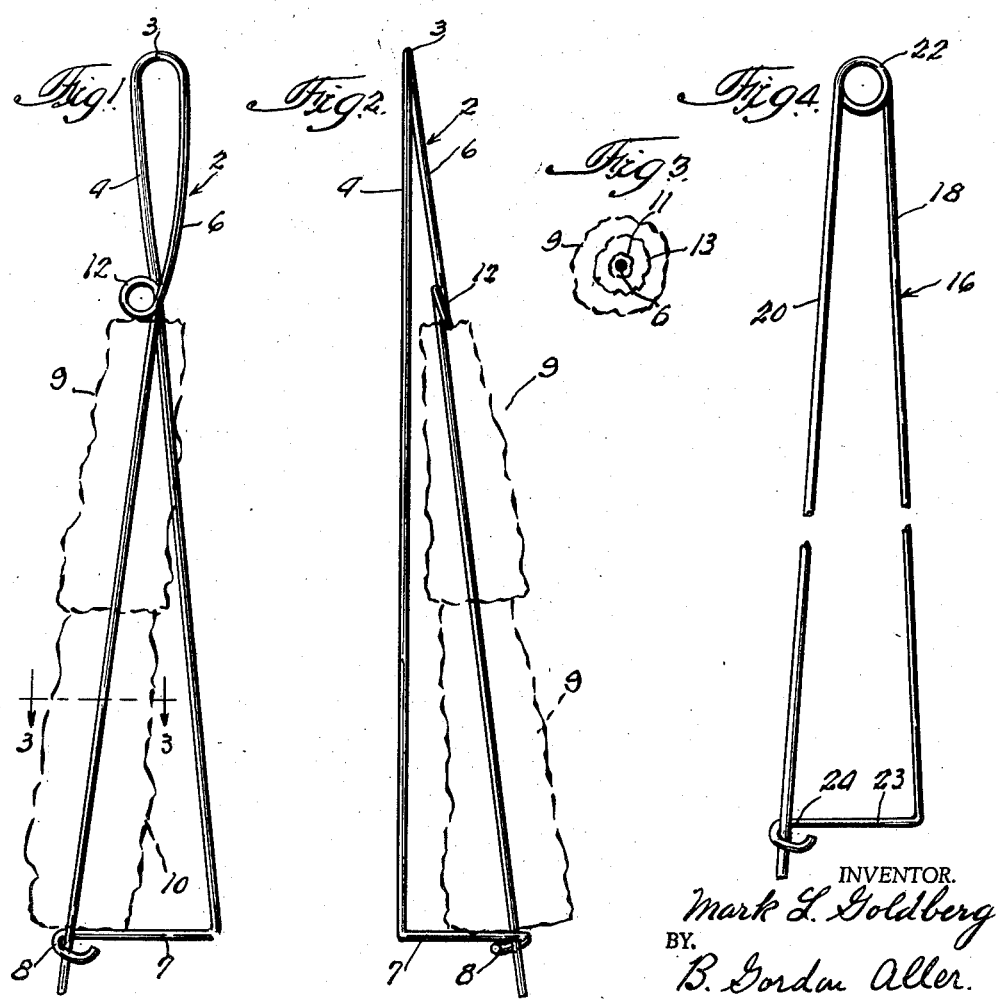
INVENTOR.
Mark L. Goldberg.
BY
B. Gordon Aller.

Sept. 9, 1958 M. L. GOLDBERG 2,851,362
METHOD OF DEBONING FOWL NECKS
Filed April 15, 1957 2 Sheets-Sheet 2
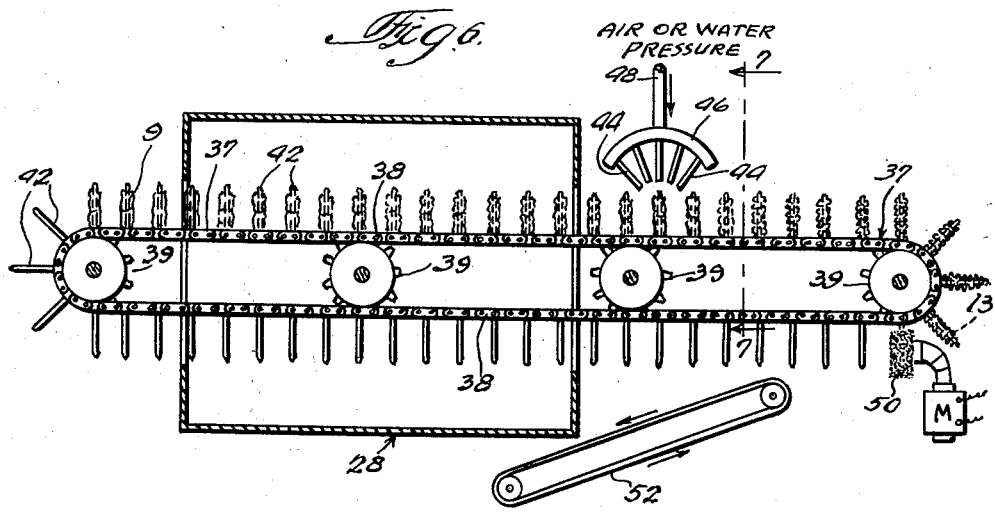
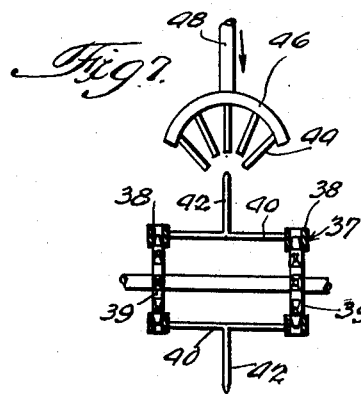
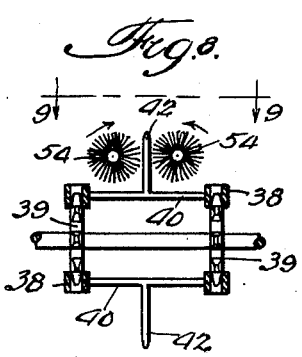
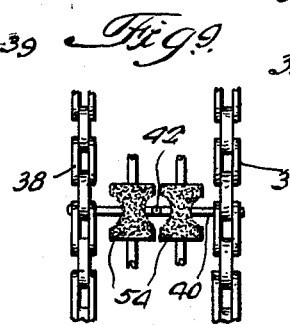
INVENTOR.
Mark L. Goldberg.
BY B. Gordon Aller.
Atty.

United States Patent Office 2,851,362
Patented Sept. 9, 1958

2,851,362
METHOD OF DEBONING FOWL NECKS

Mark L. Goldberg, Glencoe, Ill.

Application April 15, 1957, Serial No. 652,827

5 Claims. (Cl. 99—107)

This invention relates to the art of deboning fowl, and more particularly to a novel method and means for efficiently and economically cooking and removing the meat from the necks of poultry such as fowl, chickens, turkeys, and the like. The terms "poultry" and "fowl" are used synonymously herein.

According to prior art practices, commercial deboners of chicken have been unable to economically obtain the meat from the necks of such fowl. Removal of the meat from uncooked necks is dangerous and slow, requiring elaborate cutting and scraping with a sharp knife.

Another disadvantage of deboning uncooked fowl necks has been the excessive loss of meat due to the inability of an operator to completely cut the meat from the bones.

Removal of the meat from cooked necks is also slow due to the difficulty of handling hot necks or the loss of time involved in cooling them. Also in deboning cooked fowl necks, pieces of bone are broken away or the bones become separated from each other and become commingled with the meat to an extent which makes complete separation thereof practically impossible.

Another difficulty in the deboning of cooked fowl necks is the necessity for overcooking the external meat in order to afford adequate cooking of the internal meat as is necessary to efficient removal of the meat from the bones.

As a result of the foregoing problems in the art, most commercial deboners of fowl have reluctantly discarded the necks, which are sold in bulk to be used for less valuable products than preserved boned chicken sold in cans or jars at a relatively high price in high grade food stores, or as shredded meat of fowl for use in making chop suey, chicken salad, canned chicken and the like.

Accordingly, a primary object of the invention has been to devise a novel method and means for deboning fowl necks efficiently, economically, and with substantially no loss of meat.

Another object of the invention is to prevent the bones from becoming commingled with the meat.

Still another object of the invention is to eliminate the necessity for a conventional cutting instrumentality, such as a knife, in the deboning of fowl necks.

A further object of the invention is to cook the fowl necks in such manner that the external and internal meat are more uniformly cooked.

Still another object of the invention is to cook the fowl necks and subsequently debone them without the necessity for manual handling or with a minimum of handling.

Yet another object of the invention is to cook the fowl necks by supporting them in spaced relationship to each other as, for example, in a steam chamber or oven to insure uniform heating of each neck.

Still another object of the invention is to pass the necks by means of a conveyor through a cooking chamber (whether electric, steam or hot air) and thence through a deboning area.

A more specific object of the invention is to pass a support through the center of the neck along its longitudinal axis so that the support passes through the central openings of the neck bones. A lock is then provided or the support is held in a positon such that the neck bones cannot fall off. The necks are then cooked and the meat subsequently removed, as for example by manual or mechanical oscillation of the support, or by drawing the necks against a fixed or movable meat stripper, or by subjecting the necks to a blast of compressed air or water, or even by manual operation of a meat stripping instrumentality. The bones are then removed from the support.

Preferably, the support which is inserted through the holes of the neck bones is a good conductor of heat such as aluminum or steel, for example, which effectively facilitates cooking of the meat from the inside as well as the outside of the neck.

In certain embodiments of the invention specifically illustrated herein, the support is designed for manual oscillation or manipulation after cooking of the necks and is provided with a convenient handle portion for that purpose, and in other embodiments illustrated herein the support is particularly adapted to mechanized deboning wherein the necks are conveyed through a cooking chamber and then through a deboning area for mechanical or manual deboning.

The foregoing and other objects and advantages of the invention will become apparent from a consideration of the following specification and the accompanying drawings, wherein:

Figure 1 is a side elevational view of a preferred embodiment of the novel fowl neck support;

Figure 2 is an edge elevational view thereof;

Figure 3 is a sectional view on line 3—3 of Figure 1;

Figure 4 is a side elevational view of a modified fowl neck support;

Figure 5 is a diagram of a mechanized deboning apparatus utilizing the fowl neck support of Figures 1 and 2 or of Figure 3;

Figure 6 is a diagram of another mechanized deboning apparatus;

Figure 7 is a sectional view on line 7—7 of Figure 6;

Figure 8 is a fragmentary view similar to Figure 7 but illustrating a modified deboner; and Figure 9 is a plan view on line 9—9 of Figure 8.

Describing the invention in detail and referring first to Figures 1 and 2 which illustrate a preferred embodiment of a novel fowl neck support 2 utilized in the practice of the invention, it will be seen that said support comprises a handle portion 3 defined by a pair of segments 4 and 6 which are preferably integrally interconnected as part of a single continuous length of flexible resilient material such as, for example, spring tempered or hardened steel wire.

The segment 4 comprises at its free end a bent or angular portion 7 with a hook portion 8 adapted to be releaseably engaged with the segment 6 to retain thereon one or a plurality of fowl necks 9 which are threaded on the segment 6 in such manner that the latter extends through the central openings 11 (Figure 3) of the neck bones 13. The segment 6 also comprises a loop portion 12 larger in diameter than the holes 11 to afford means for maintaining the necks in spaced relationship to the handle portion 3 of the support.

The invention may be practiced by inserting segment 6 through the openings 11 of the neck bones 13 of one or more uncooked chicken necks. Hook portion 8 is then engaged with segment 6 to hold the necks on the latter. A hook or other suspension means may then be inserted between the segments 4 and 6 at the handle portion 3 of the support 2 to suspend the support 2 in the position shown in Figures 1 and 2 with the poultry necks immersed in boiling water or otherwise associated with cooking means until the necks are thoroughly cooked from the interior to the exterior thereof.

The operator then removes the handle portion 3 from its suspension, not shown, and then grasping the handle portion 3 with one hand agitates or oscillates the support 2 until the meat is thrown off the bones 13. If desired, the meat removal may be facilitated by use of a scraper, abrader, or knife to clean the meat from the bones; however, with the meat thoroughly cooked, the use of such an instrument is not normally necessary.

After the meat has been removed from the bones 13, the hook portion 8 is released from segment 6 and the bones are dropped or flung off the segment 6, whereupon the novel neck support 2 is ready for use in another cycle.

As above noted, the support 2 may be formed of any flexible material capable of withstanding the cooking process; however, a good conductor of heat, such as spring tempered or hardened steel, is preferred so that the cooking heat is transmitted by the segment 6 to the interior of the bones 13 thereby cooking the necks from the inside toward the outside, as well as from the outside toward the inside.

It will also be apparent to one skilled in the art that the novel support 2 may be fabricated in any desired shape and of any desired number of component parts, the simple one piece construction shown being by way of illustration and not limitation.

For example, another embodiment of the novel support is shown at 16 in Figure 4 wherein it will be seen that segments 18 and 20 of a continuous strand of resilient wire are inter-connected by a loop portion 22 and diverge therefrom toward their free ends. Segment 18 is provided with an angular portion 23 having a hook portion 24 to releaseably engage the segment 20 to hold thereon one or more fowl necks through which the segment 20 has been inserted as heretofore described.

The loop portion 22 affords convenient means for hanging the support 16 above or within a cooker during cooking of the necks, and the segments 18 and 20 along portions thereof immediately adjoining the loop portion 22 define a convenient handle portion for handling the support 16 as above described in connection with the embodiment of Figures 1–3.

Figure 5 is a somewhat diagrammatic side view of a mechanized cooking and deboning apparatus utilizing the form of fowl neck support 2 shown in Figure 1.

A plurality of supports 2 are suspended, as for example on hooks 25, on a moving belt or chain 26 which carries the fowl necks 9 in spaced relationship to each other through a cooker 28 at a rate of speed such that the necks passing from the outlet side of the cooker are thoroughly cooked with the meat just ready to fall from the bones. As the necks emerge from the outlet side of the cooker they are subjected to a blast of compressed air or water from one or more nozzles 30 connected to a header 32 supplied with compressed air or water by an inlet 34.

The meat of the necks is thus blasted by the compressed air from the neck bones and is removed, for example, by an endless belt conveyor 36 for further processing as, for example, cutting and canning.

A modified apparatus is shown in Figures 6 and 7 wherein an endless conveyor 37 comprises a pair of chains 38 actuated by sprockets 39 and interconnected by rods 40 each of which carries a sharp pointed spring tempered or hardened steel spindle 42.

Before the spindles 42 pass into the inlet side of the cooker 28 the necks are threaded onto the spindles from the top thereof. The spindles then pass through the cooker and as the cooked necks emerge from the outlet side of the cooker they are subjected to a blast of compressed air or water from a plurality of converging air or water nozzles 44 to which compressed air or water is supplied by a header 46 connected to an inlet 48.

After the necks have thus been deboned, the spindles 42 reach the sprocket 39 at the opposite end of the conveyor 37 and are inverted so that the bones fall off into a convenient receptacle not shown. If desired, a power rotated brush 50 may be utilized to facilitate the gravity removal of the bones.

The meat falls upon an endless belt type conveyor 52 and is removed from the apparatus for further processing.

Figures 8 and 9 illustrate a modification of Figure 6 wherein a pair of brushes 54 are utilized in substitution for the compressed air blast to remove the meat from the cooked necks. It will also be understood that other mechanically or manually operated means may be utilized to remove the meat from the cooked bones before removal thereof from the spindles.

Thus it will be understood that the invention comprehends a novel method and means for deboning fowl necks efficiently and economically without handling the necks after cooking and without any possibility of commingling of the meat and neck bones.

Another important feature of the invention is the efficient cooking of the necks at a substantially uniform rate from the inside to the outside and from the outside to the inside.

While the present invention has been explained and described with reference to specific embodiments of structure, it will be understood, nevertheless, that numerous modifications and variations are susceptible of being incorporated without departure from the essential spirit or scope thereof. Accordingly, it is not intended for an understanding of this invention to be limited by the foregoing description nor by the illustrations in the annexed drawings, except as indicated in the hereinafter appended claims.

What is claimed as new and desired to be secured by Letters Patent of the United States is as follows:

1. A method of deboning a fowl neck comprising inserting a heat conductive support through the central openings of the neck bones, then cooking the neck, then removing the meat from the bones by directing pressure fluid against the necks, and then removing the bones from the support.

2. In a method of deboning a fowl neck, the steps of inserting a heat conductive member through the central openings of the neck bones, then subjecting the neck and member to heat from within as well as without until the neck meat it cooked, and then removing the meat from said bones with the member extending through said openings.

3. In a method of deboning a fowl neck, the steps of threading a heat conductive support through the central openings of the neck bones, and then without removing the support cooking the neck and removing the meat from the bones by directing a pressure force against said cooked meat.

4. A method of deboning fowl necks comprising inserting a heat conductive support through the central openings of the neck bones, applying heat to said neck and support so that said neck is heated from within as well as without until the meat is readily separable from the bones then removing the meat from the bones and then removing the bones from said support.

5. A method of deboning fowl necks comprising threading a plurality of fowl necks on a series of heat conductive supports, said necks being threaded on said supports through the central openings of the neck bones; applying heat to said threaded necks and supports so that the necks are heated from within as well as without until the meat on said necks is readily separable from the bones then removing the meat from the bones and then removing the bones from said supports.

References Cited in the file of this patent

UNITED STATES PATENTS

| | | |
|---|---|---|
| 1,890,907 | Hoover | Dec. 13, 1932 |
| 2,553,113 | Ruggiero | May 15, 1951 |
| 2,587,133 | Finizie | Feb. 26, 1952 |
| 2,761,479 | Geisler et al. | Sept. 4, 1956 |
| 2,789,908 | Doepkin | Apr. 23, 1957 |